OTTO OSTEN.
Improvement in Machines for Sawing Staves.
No. 128,243. Patented June 25, 1872.

Witnesses  
Jno. L. Boone  
George Wuest Jr.

Inventor  
Otto Osten  
per Dewey & Co.  
Attys

UNITED STATES PATENT OFFICE.

OTTO OSTEN, OF TAHOE CITY, CALIFORNIA.

IMPROVEMENT IN MACHINES FOR SAWING STAVES.

Specification forming part of Letters Patent No. 128,243, dated June 25, 1872.

SPECIFICATION.

*To all whom it may concern:*

Be it known that I, OTTO OSTEN, of Tahoe City, county of Placer, State of California, have invented Improvements in Machines for Sawing Staves; and I do hereby declare the following description and accompanying drawing are sufficient to enable any person skilled in the art or science to which it most nearly appertains to make and use my said invention or improvements without further invention or experiment.

My invention relates to improvements in that class of stave-sawing machines in which a hoop-saw is revolved upon friction-rollers, and the stick of wood from which the staves are to be cut fed past it by a carriage moving upon the curved track. My improvements are fully described below, reference being had to the accompanying drawing forming a part of this specification, in which—

Figure 1:
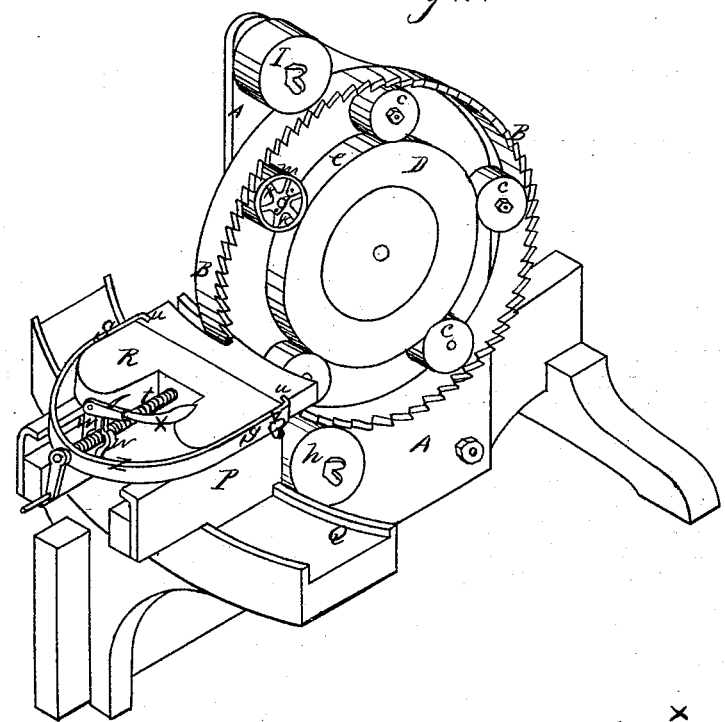
Figure 2:
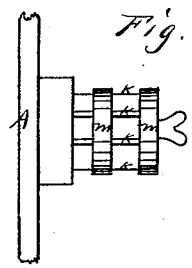
Figure 2:
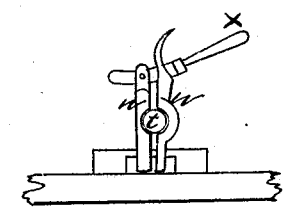
Figure 3:
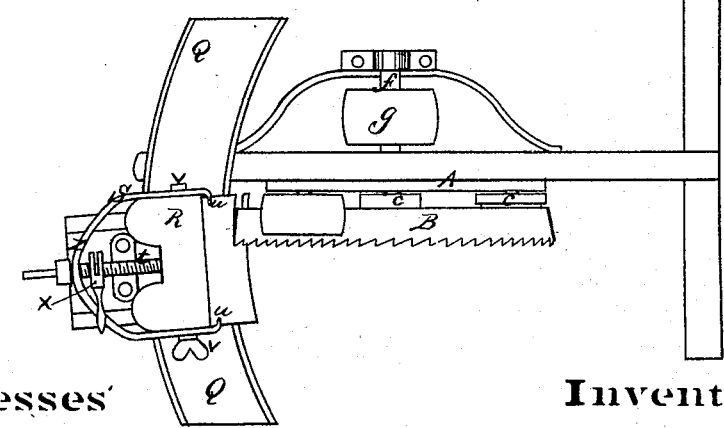

Figure 1 is a perspective. Fig. 2 shows an enlarged view of the friction-roller. Fig 3 is a plan.

A represents a vertical plate or timber, which is properly supported by a suitable frame. B is a hoop-saw, which is supported in position by the several friction or bearing-rollers $c$ $c$ $c$ at different points of its inner face. In order to provide a support for these rollers I employ a central wheel, D, of the proper size to fit inside the rollers, and place around it an elastic band or tire, $e$, against which the rollers $c$ will bear. This wheel is fixed upon a shaft, $f$, which passes through the plate or timber A and carries a pulley, $g$, on the opposite side. In the ordinary machines of this class the saw is revolved by an endless belt from the main driving-shaft which passes forward under the pulley $h$ below the saw, thence back and partly around the saw to the pulley I above it, whence it passes back to main driving-pulley again. Besides this application of power, I also belt from the main driving-shaft around the pulley $g$ on the shaft $f$, so as to revolve the central wheel D, and between the two powers I insure a steady revolution of the saw.

One of the difficulties in the original machine is the clogging of the rollers by the sawdust, which gets between them and the saw. To remedy this I construct the rollers in the following manner: $j$ is a hub, having a series of longitudinal radiating-ribs, K. Around these ribs I apply two bands or tires, $m$, far enough apart to leave sufficient space between them to allow the sawdust to pass into the space between the ribs, from which it will pass to the outside without clogging. Another difficulty encountered in the original machine is the binding of the saw in the kerf which it makes. The reason of this is that the hoop or saw is made in the form of a section of a true cylinder—that is, the diameter between two opposite points on the back edge of the saw is equal to the diameter between the same points on the toothed side. I remedy this difficulty by constructing the saw in the form of a section of a cone, as shown at Fig. 3, so that it shall have sufficient taper to allow it to work easily in the curved kerf of the saw. P is the carriage, which moves upon the curved track Q, and carries the stick which is to be sawed into staves. R is an adjustable block, which is arranged to be moved back and forth upon the carriage, in order to feed the block to the saw the proper width to produce a stave. S is a curved metal bar, which answers both as a clamp to hold the stick which is being sawed, and as a yoke, Z, for supporting the outer end of the adjusting-screw $t$. The opposite ends of the bar are bent so as to pass along the ends of the block R, and far enough past it to have its extremities formed into claws or dogs $u$, and screws $v$ pass through ends of the bar into the block R, so that by unscrewing them the dogs will be freed from the stick. The screw $t$ passes through a vertically-divided standard, W, the two parts of which are arranged so as to be separated by raising a lever, X, for the purpose of liberating the screw and permitting the block, yoke, and screw to be drawn back as far as desired without resorting to the slow process of retreating it by means of the screw $t$. By depressing the lever the two parts are again drawn together and provide a fulcrum for the screw. By this means I greatly improve this class of stave-sawing machines and remedy the difficulties which have heretofore been encountered.

Having thus described my invention, what I claim, and desire to secure by Letters Patent, is—

1. The central wheel D, with the elastic tire e, in combination with the bearing-rollers c, substantially as and for the purpose specified.

2. The bearing-rollers c, consisting of the hub j, with its radiating ribs k and encircling bands or tires m, applied as described, for the purpose specified.

3. I claim the hoop-saw B, when constructed in the form of a conical section, in combination with the bearing-rollers c and the central wheel D, substantially as described.

4. The bar S bent as described, so as to form a yoke, Z, and dogs u in combination with the screws t and V, substantially as and for the purpose above described.

In witness whereof I hereunto set my hand and seal.

OTTO OSTEN. [L. S.]

Witnesses:
JOHN A. HUNTINGTON,
LEWIS HUNTINGTON.